United States Patent
Beck et al.

(10) Patent No.: US 9,996,913 B2
(45) Date of Patent: Jun. 12, 2018

(54) CONTRAST BASED IMAGE FUSION

(71) Applicants: Steven D. Beck, Austin, TX (US); Derek T. Robison, Waltham, MA (US); Michael S. Chan, Medford, MA (US); John H. Koltookian, Medford, MA (US); Mark R. Mallalieu, Westford, MA (US); Christopher M. Houle, Nashua, NH (US); Kari M. Karwedsky, Merrimack, NH (US)

(72) Inventors: Steven D. Beck, Austin, TX (US); Derek T. Robison, Waltham, MA (US); Michael S. Chan, Medford, MA (US); John H. Koltookian, Medford, MA (US); Mark R. Mallalieu, Westford, MA (US); Christopher M. Houle, Nashua, NH (US); Kari M. Karwedsky, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days. days.

(21) Appl. No.: 14/896,421

(22) PCT Filed: Apr. 1, 2015

(86) PCT No.: PCT/US2015/023831
§ 371 (c)(1),
(2) Date: Dec. 7, 2015

(87) PCT Pub. No.: WO2015/157058
PCT Pub. Date: Oct. 15, 2015

(65) Prior Publication Data
US 2016/0093034 A1    Mar. 31, 2016

Related U.S. Application Data

(60) Provisional application No. 61/976,166, filed on Apr. 7, 2014.

(51) Int. Cl.
*G06K 9/32* (2006.01)
*G06K 9/62* (2006.01)
(Continued)

(52) U.S. Cl.
CPC .............. *G06T 5/50* (2013.01); *G06K 9/3241* (2013.01); *G06K 9/6289* (2013.01);
(Continued)

(58) Field of Classification Search
CPC .. G06K 9/3241; G06K 9/6289; G06K 9/6288; G01J 5/02; G01J 5/00;
(Continued)

(56) References Cited

U.S. PATENT DOCUMENTS 7,620,265 B1    11/2009  Wolff et al.
9,508,136 B2 *  11/2016  Lee .......................... G06T 5/50
(Continued)

FOREIGN PATENT DOCUMENTS

EP         2690582 A1    1/2014
KR    10-2005-0103194    10/2005
WO         2010141772    9/2010

OTHER PUBLICATIONS

PCT/US2015/023831 International Search Report dated Jun. 22, 2015.
(Continued)

*Primary Examiner* — Ke Xiao
*Assistant Examiner* — Andrew Shin
(74) *Attorney, Agent, or Firm* — Hayes Soloway; Scott J. Asmus

(57) ABSTRACT

A system for two color image fusion blending co-registered low light level images in the visible region of the electromagnetic spectrum with thermal infrared images maximizes the information content of the scene by detecting in which of the two image types, IR and visible, there is more
(Continued)

structural information and increasing the weight of the pixels in the image type having the most structural information. Additionally, situational awareness is increased by categorizing image information as "scene" or "target" and colorizing the target images to highlight target features when raw IR values are above a predetermined threshold. The system utilizes Red, Green and Blue (RGB) planes to convey different information such that for targets the Red plane is used to colorize regions when raw IR exceeds the predetermined threshold. For scene images, the Green plane provides improved situational awareness due to the above weighted blend of the two image types.

18 Claims, 13 Drawing Sheets

(51) Int. Cl.
G08B 13/181 (2006.01)
G01J 5/00 (2006.01)
H04N 5/33 (2006.01)
G06T 5/50 (2006.01)
G06T 3/40 (2006.01)
G06T 5/00 (2006.01)
G09G 5/02 (2006.01)

(52) U.S. Cl.
CPC ............ *G06T 3/4061* (2013.01); *G06T 5/001* (2013.01); *G06T 5/002* (2013.01); *G08B 13/181* (2013.01); *G09G 5/026* (2013.01); *G06T 2207/10024* (2013.01); *G06T 2207/10048* (2013.01); *G06T 2207/20221* (2013.01); *G09G 2320/0271* (2013.01); *G09G 2320/066* (2013.01); *G09G 2340/10* (2013.01); *G09G 2340/14* (2013.01); *G09G 2360/16* (2013.01)

(58) Field of Classification Search
CPC ............ G01J 2005/0077; G01J 5/0022; G01J 5/0025; H04N 5/33; H04N 5/332; F41H 3/00; G02B 23/12; G08B 13/181; G06T 2207/10; G06T 2207/10048; G06T 2207/20212; G06T 2207/20221
See application file for complete search history.

(56) References Cited

U.S. PATENT DOCUMENTS

| | | | |
|---|---|---|---|
| 2007/0177819 A1* | 8/2007 | Ma | G06K 9/00771 382/284 |
| 2009/0051760 A1 | 2/2009 | Ottney | |
| 2012/0098972 A1* | 4/2012 | Hansen | H04N 5/2258 348/164 |
| 2012/0113266 A1 | 5/2012 | Golan et al. | |
| 2013/0057698 A1 | 3/2013 | Hayes et al. | |

OTHER PUBLICATIONS

Piella et al., "A New Quality Metric for Image Fusion". Proceedings 2003 International Conference on Image Processing (Cat. No. 03CH37429), Barcelona, Spain, Sep. 14-17, 2003, IEEE, IEEE Piscatawy, NJ, vol. 3, Sep. 14, 2003, pp. 173-176.

Anwaar-Ul-Haq et al., "An Optimized Image Fusion Algorithm for Night-Time Surveillance and Navigation". Emerging Technologies, 2005. Proceedings of the IEEE Symposium on Islambad, Pakistan Sep. 17-18, 2005, Piscataway, NJ, pp. 138-143.

Xiuqiong Zhang et al., "Comparison of Fusion Methods for the Infrared and Color Visible Images". Computer Science and Information Technology, 2009. ICCSIT 2009, 2nd IEEE International Conference on, IEEE, Piscataway, NJ, pp. 421-424.

Li X et al., "Efficient Fusion for Infrared and Visible Images Based on Compressive Sensing Principle". IET Image Process, vol. 5, No. 2, Mar. 2011, pp. 141-147.

Burt P J et al., "Enhanced Image Capture Through Fusion". Computer Vision, 1993. Proceedings, Fourth International Conference on Berlin, Germany May 11-14, Los Alamitos, CA, pp. 173-182.

Rockinger O, "Image Sequence Fusion Using a Shift-Invariant Wavelet Transform", Proceedings/International Conference on Image Processing: Oct. 26-29, 1997, Santa Barbara, CA, IEEE Comput. Soc., vol. 3, pp. 288-291.

Nercessian S C et al., "Multiscale Image Fusion Using an Adaptive Similarity-Based Sensor Weighting Scheme and Human Visual System-Inspired Contrast Measure". Journal of Electronic Imaging, vol. 21, No. 2, 021112, May 10, 2012, pp. 021112-1-021112-1.

European Search Report, EP 15776749, dated Sep. 14, 2017, 12 pages.

* cited by examiner

CONTRAST BASED IMAGE FUSION

RELATED APPLICATIONS

This application claims rights under 35 USC § 119(e) from U.S. Application Ser. No. 61/976,166 filed Apr. 7, 2014, the contents of which are incorporated herein by reference.

STATEMENT OF GOVERNMENT INTEREST

This invention was made with United States Government support under Contract No. W91CRB-07-C-0098 awarded by the Department of the Army. The United States Government has certain rights in this invention.

FIELD OF INVENTION

The invention relates to imaging and more particularly to contrast-based image fusion.

BACKGROUND OF THE INVENTION

Heretofore considerable work has been done on night vision devices which collect energy from scenes in multiple bands and convert the energy to electrical signals which are digitally processed, fused and presented in real time as full motion video on a display for viewing by the user. One of these systems is a so-called two color system in which infrared images and visible light images are fused together in the final image. These prior multiband digitally processed fusion techniques are intended to increase image detail. A need still exists, however, for a way to blend co-registered low visible light level images with thermal infrared (IR) images in a way that maximizes the scene detail, especially in very low light conditions, in scenes with very bright lights, and in smoke or fog conditions.

Specifically, in the past, infrared light and visible light have been fused together in a two color image fusion process that blends co-registered low light level images. In these systems increased contrast enhancement is available through a thermal local area contrast enhancement (LACE) algorithm, and is especially useful in low light and in well illuminated scenarios. Like techniques are applied in the visible light channel. Both of these local area contrast enhancement (LACE) techniques involved histogram preprocessor functions to add contrast for improved detail. Moreover, a number of noise rejection functions and algorithms were used to correct for nonuniformity related to temperature changes and shifts. Additionally, gain correction algorithms provided uniformity for each pixel, whereas row noise reduction algorithms normalized the levels of the rows. Further, cluster de-noise algorithms removed flashing out of a family of pixels in low light scenarios, whereas optical distortion correction was applied between the co-registered visible light images and the IR images using translation, rotation and magnification. Finally, focal actuated vergence algorithms were utilized to correct for parallax errors.

All of the above techniques were used to remove noise and other artifacts prior to being passed to a fusion algorithm to provide a co-registered fused image composed of infrared and visible light images.

However, there is a need for further improvement of the fused image to be able to emphasize structural content information in the final fused image, thus to further improve image detail.

SUMMARY OF THE INVENTION

Embodiments of the present disclosure provide a system and method that maximizes information content in an image fusion process that blends co-registered low light level images in the visible region of the electromagnetic spectrum with thermal infrared images, said infrared and visible images constituting two different image types. Briefly described, in architecture, one embodiment of the system, among others, can be implemented as follows. A fusion module detects which of the two image types has a greater quantity of structural information and increases a weight of the pixels in the image type detected to have the greater quantity of structural information.

The present disclosure can also be viewed as providing methods of maximizing information content in an image fusion process by blending co-registered low light level visible images in a visible region of the electromagnetic spectrum with thermal infrared images, said infrared and visible images constituting two different image types. In this regard, one embodiment of such a method, among others, can be broadly summarized by the following steps: detecting, in a fusion module, which of the two image types of the visible images and the infrared images has a greater quantity of structural information; and increasing a weight of pixels in the image type detected to have the greater quantity of structural information.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

These and other features of the subject invention will be better understood in connection with the Detailed Description in conjunction with Drawings, of which.

DETAILED DESCRIPTION

Figure 1:
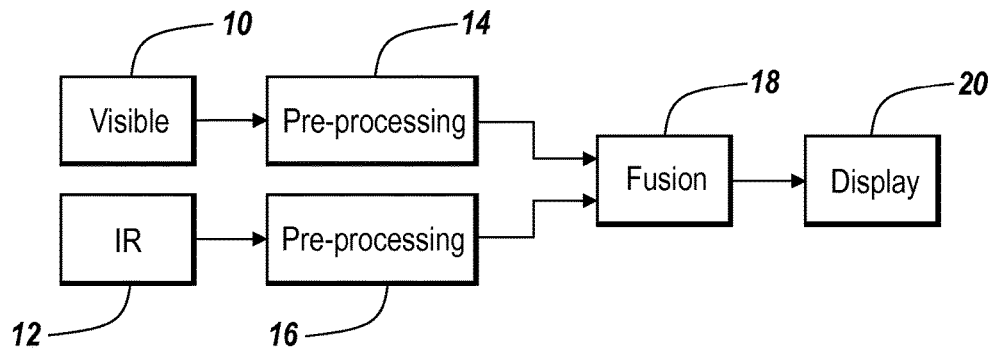
FIG. 1 is a block diagram illustrating the preprocessing of visible images and infrared images, followed by a technique that emphasizes detail in the images, in accordance with a first exemplary embodiment of the present disclosure.

A fusion algorithm fuses thermal images and visible light images by utilizing a blending function based on the contrast, or average deviation, in each of two channels, namely, a thermal image infrared channel and a low light visible image channel, and gives more weight to the channel with the most structural information. In one embodiment, a contrast detector is utilized for each of the two channels, with pixels in each of the two channels being weighted in accordance with the output of the contrast detector to increase the weight of the pixels in the channel having the most contrast, and thus most structural information.

In one embodiment, the images built up in the aforementioned weighting system are made available from a Green plane, which in general produces a situational awareness greenish image of the scene such as would be acquired by night vision goggles.

While the above describes a scene mode, in one embodiment there is a color enhancing target mode for emphasizing targets when the terrain is highly illuminated. In order to accommodate the color enhancing target mode, the image displayed is switched from the scene mode to the target mode when the raw infrared pixel levels are above a predetermined threshold level.

Assuming for the moment, that the raw IR is below the threshold, then what is presented and displayed is the scene mode in which blended visible/IR emphasizes pixels in the channel having the more structural information.

When the raw infrared signal is above a user defined threshold, then the target mode is what is displayed. Here due to color change algorithms infrared pixels change from their normal value to orange or red, whereas low light level visible pixels are shown in the green with a level equal to the low light level, divided by two. These color changes resulted in an image that constitutes the target image, with a fuse multiplexer switching to the target mode from the scene mode when the raw infrared is above the aforementioned threshold.

The result is that when raw infrared is below a predetermined threshold, what is presented, is the contrast enhanced scene which blends visible and infrared based on structural information.

However, when the raw infrared exceeds a predetermined threshold, a fuse multiplexer displays the target image, which is the aforementioned color changed image. What happens in this case is that target image pops out due to the coloration.

According to one embodiment, when in the scene mode, the fusion algorithm selects the blended visible/IR image that emphasizes images having the better structural information. This blended visible/IR image is based on the average deviation in the Red and Blue planes as computed globally over the entire image, or can be computed over local sub-image regions.

More particularly, in addition to enhancement due to the detection of structural information in two channels, in one embodiment, color is used to emphasize a target. The scene mode and target mode are the two video or image presentation modes and they are selected by determining whether detected infrared exceeds a predetermined infrared threshold. In the illustrated embodiment, when the infrared value for pixel exceeds a user defined threshold, that pixel is considered belonging to a target and the fuse multiplexer chooses the target mode instead of the scene mode. When the raw infrared is above this predetermined threshold, the target color mode switches on and colors the particular pixel somewhere between orange and red depending on how much low light is present. These colors never exist in the scene mode. As a result, in high illumination situations when the detected raw infrared exceeds the predetermined threshold and the system switches to the target mode, the targets are made to pop out.

Note that in the target mode the visible light is brought in as Green, with the target pixels being somewhere between orange and red. On the other hand, when in the scene mode, scene mode pixels are from the visible light channel, with any little infrared being presented as Blue-Green. As the raw infrared level increases these pixels become more and more yellow.

As will be appreciated, the target mode is operative only when the raw infrared is above the predetermined threshold. Otherwise the scene mode is used, with the test being on a pixel by pixel basis.

For other types of enhancement, and referring now to the scene mode in which there is a Red plane, a Blue plane and a Green plane, limiters ensure that the color palette that is chosen is realized. In the scene mode, the limiter associated with the Red plane prevents pixels from becoming red or orange, as this is reserved for the target mode. The limiter associated with the Blue plane reduces the color swing across varying levels of light. The minimum in the Blue plane insures that in an area of strong infrared, the visible aspect still will be represented.

Thus, in the scene mode and as to the limiters, for IR image pixels that do not exceed the thermal target threshold, their intensity is reduced to G/2. In the case of visible light pixels, when the IR pixel intensities do not exceed the thermal target threshold, their intensity is, LLL/4 or LLL-IR, whichever is larger, limited to G/2, where G is the intensity of the Green plane pixels and LLL refers to the intensity of the low light level Blue plane pixels.

The technique is best described by comparing images fused using the standard A+B fusion method and the new local contrast-based fusion method. In the contrast fusion method, two images are fused together and displayed in the Red/Green/Blue (RGB) color planes using the following scheme. If the raw IR does not exceed the Target Threshold, the Green plane displays a weighted combination of the pixels from the thermal camera and low light level camera to increase the weight of images that have a high structural content. The weightings which are based on structural content are a function of the average deviation computed within each image, either globally or locally, and are designed to add more weight to the image region with the most structural content, as defined by the average deviation.

If the raw IR exceeds a predefined threshold (Target Threshold), the Red plane displays a color enhanced thermal camera pixel and the Blue plane displays a bracketed or limited version of the low light level camera pixel from the Blue plane.

The resulting detail rich image is the result of simply adding the thermal image pixel values with the low light level pixel values in the Green plane utilizing the above contrast enhancement algorithm involving detecting average deviation in the image.

In addition to the detail enhancement associated with the Green plane, because there is a loss of detail in regions of strong light and in dark areas, generating the Green plane by fusing clipped and weighted versions of the thermal pixels in the Red plane with clipped and weighted versions of the low light level pixels in the Blue plane, the effect of strong light or darkness is eliminated in the final rendered fused image.

Regardless of the other enhancements described above, the finally rendered image is the result of the new contrast-based fusion method which provides significantly more detail by increasing the weight of either the infrared pixels or the visible light pixels for those images having the stronger structural content as measured by average deviation.

In summary, a system for two color image fusion blending co-registered low light level images in the visible region of the electromagnetic spectrum with thermal infrared images maximizes the information content by detecting in which of the two image types, IR and visible, there is more structural information and increasing the weight of the pixels in the image type having the most structural information. Additionally, situational awareness is increased by categorizing image information as "scene" or "target" and colorizing the target images to highlight target features when raw IR values are above a predetermined threshold. The system utilizes Red, Green and Blue (RGB) planes to convey different information such that for targets the Red plane is used to colorize regions when the raw IR exceeds the predetermined threshold. For scene images, the Green plane provides improved situational awareness due to the above weighted blend of the two image types.

FIG. 1 is a block diagram illustrating the preprocessing of visible images and infrared images, followed by a technique that emphasizes detail in the images, in accordance with a first exemplary embodiment of the present disclosure. A fusion enhancement system for use in enhanced night vision goggles takes light from a low light visual channel 10, and thermal images from an infrared channel 12 and pre-processes them as illustrated at 14 and 16, after which the subject fusion algorithm is applied as illustrated at 18 to display at 20 an enhanced image in which detail is increased to aid in situational awareness.

Figure 2:
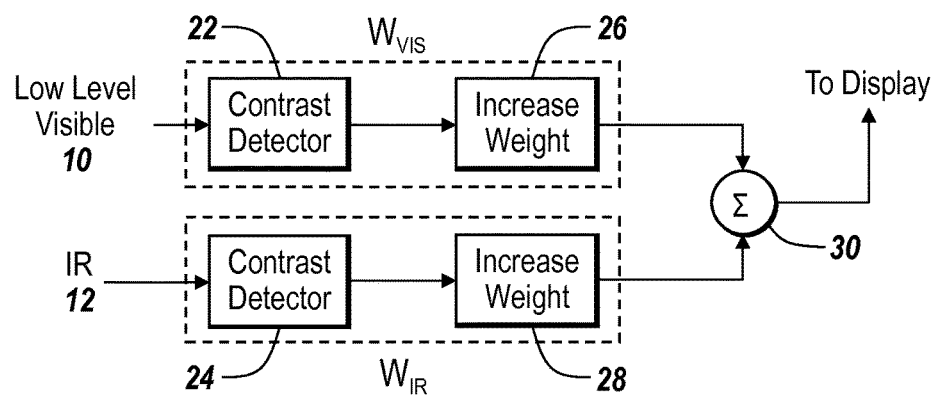
FIG. 2 is a block diagram showing the utilization of contrast detection in the low level visible channel and the infrared channel, in which the weight of pixels in a channel having increased contrast is increased, thus to emphasize images having the better structural information, in accordance with the first exemplary embodiment of the present disclosure.

FIG. 2 is a block diagram showing the utilization of contrast detection in the low level visible channel and the infrared channel, in which the weight of pixels in a channel having increased contrast is increased, thus to emphasize images having the better structural information, in accordance with the first exemplary embodiment of the present disclosure. Central to the enhancement of the fusion process described in FIG. 1 is the enhancement of structural detail in the finally rendered image. Here visible light 10 and infrared light 12 in two separate channels are applied to respective contrast detectors 22 and 24 which detect the contrast in the images in each of these channels. The contrast is detected in one embodiment utilizing standard deviation techniques, with images having increased structural information as detected by the contrast detectors resulting in increased weight shown at 26 and 28, respectively for the two channels. In this way pixels are multiplied by the increased weights in the visible and infrared channels and are summed at 30, at which point they are ultimately used to drive display 20 of FIG. 1, after having been coupled to a fuse multiplexer 38 of FIG. 3.

The result of so doing is to provide increased weight to those channels having increased structural information. The result is the highlighting or enhancement in a combined image of the infrared and visible image channels so that what is presented is an image having increased sharpness and clarity.

Figure 3:
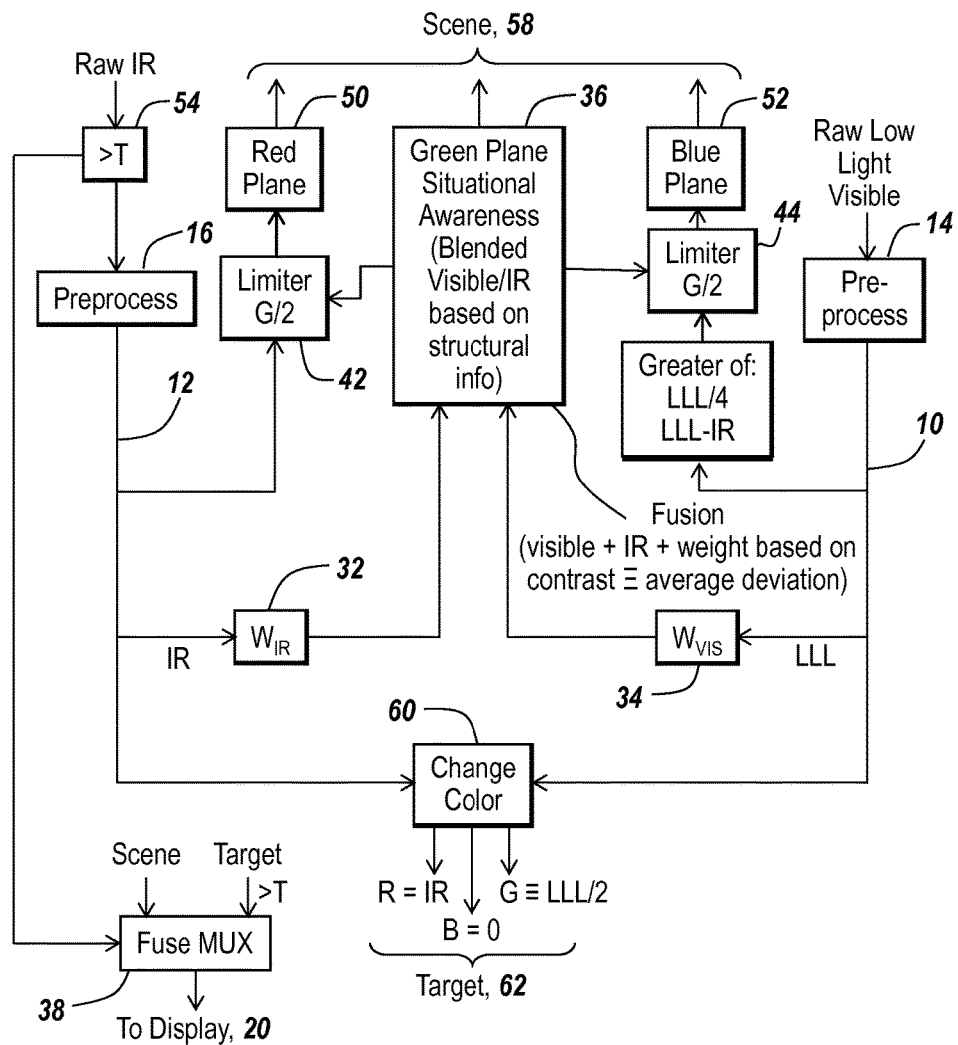
FIG. 3 is a block diagram showing the utilization of the weighting technique described in FIG. 2, combined with additional processing techniques to increase and emphasize detail in both low light and strong illumination situations, in accordance with the first exemplary embodiment of the present disclosure.

FIG. 3 is a block diagram showing the utilization of the weighting technique described in FIG. 2, combined with additional processing techniques to increase and emphasize detail in both low light and strong illumination situations, in accordance with the first exemplary embodiment of the present disclosure. The weights $W_{IR}$ and $W_{VIS}$, here shown at 32 and 34 generated through the contrast detection system of FIG. 2, are applied to a Green plane situational awareness module 36 which generates a blended visible/IR image based on structural information. As will be seen, the weighted pixels come from infrared channel 12 and low light visible channel 10, with the light in these channels having been preprocessed as illustrated at 14 and 16 by sophisticated preprocessing techniques to be described hereinafter.

Limiters 42 and 44, having as inputs the preprocessed raw IR from channel 12 and the preprocessed raw low light visible light from channel 10 process the infrared and visible light and couple them respectively to a Red plane 50 and a Blue plane 52. In the case of the Red plane, limiter 42 limits the Red plane pixels to the level associated with the Green plane pixels divided by two. For Blue plane 52 the visible light is the greater of LLL/4 or LLL-IR, limited to the Green plane pixels divided by two. It will be noted that the limiters ensure that the color palette chosen is realized. The limiter on the red channel prevents pixels from becoming red or orange, as this is reserved for the target mode to be described hereinafter. The minimum for the blue channel ensures that in an area of strong IR, the visible aspect is still represented.

The result of having generated the Red plane, the Green plane and the Blue plane is that the corresponding scene images 58 are coupled to display 20 through fuse multiplexer 38 if the raw intensity of the raw IR is below a predetermined threshold. Thus, in the case where there is low IR, the blended visible/IR scene image 58 based on structural information is used to provide increased clarity and sharpness.

As will be appreciated, what is coupled to display 20 is a fusion first and foremost of the weighted versions of the visible and infrared channels. It will be appreciated that the weighted blended visible/IR pixels in the Green plane may be used by themselves to drive display 20.

However, for situations in which the intensity of the raw infrared energy is above a predetermined threshold 54, fuse multiplexer 38 deselects the scene image 58 and selects a target image 62 which is the result of a color change operation provided by a color change module 60. It will be noted that the inputs to color change module 60 are the preprocessed infrared light from infrared channel 12 and the pre-processed visible light from low light visible channel 10.

The color change engendered by the color change module is such that the infrared color is the color red, whereas the green is LLL/2. In this case B=0, with the target 62 defined to be the output of the color change module.

In operation, when the raw infrared light intensities are less than the threshold set by threshold detector 54, the scene image 58 is that which is coupled by the fuse multiplexer 38 to display 20. On the other hand, if the intensity of the raw infrared intensity is greater than the threshold set by threshold detector 54, then fuse multiplexer 38 selects the target image 62 to be coupled to display 20.

The result for low IR is that the blended visible/IR image based on structural information is coupled to display 20, whereas in situations where the raw infrared intensity is greater than the threshold set by threshold detector 54, it is the color changed image which is coupled by fuse multiplexer 38 to display 20.

Thus, for low light situations, one has increased sharpness based on the weighting of the infrared or visible light depending on which channel has more structural information, whereas for highly lit scenarios, that which is presented by display 20 is a colorized version which highlights or pops up targets within the field of view of the cameras.

As described above, the scene or target modes are determined by whether the IR exceeds the predetermined threshold. The RGB from both the scene and the target images are coupled to the fuse multiplexer which controls which of the two modes are used based on raw IR levels. Thus, the multiplexer is used to select between scene and target modes based on the predetermined threshold. It will be noted that when the raw IR value exceeds a user configured threshold, that pixel is considered a target, and the fuse multiplexer chooses the target mode instead of the scene mode. When the raw IR is above the threshold, the color switches making that pixel emphasized as being somewhere between orange and red. These colors never exist in the scene mode.

In the scene mode if there is little IR which will be given a blue green tint. As IR increases, the IR pixels will become more and more yellow.

In summary, structural information is detected in each of the two channels and pixels having the better structural information are given greater weights. Secondly, if the infrared channel value is above a predetermined threshold, then color change algorithms enhance the colors to promote target awareness. Finally, limiters are provided to limit the Red plane and Blue plane components in low light situations and to prevent coloration in case the IR is below the predetermined threshold. The limiter on the red channel prevents pixels from becoming red or orange, as this is reserved for the target mode. The minimum for the blue channel ensures that in an area of strong IR, the visible aspect is still represented.

Figure 4:
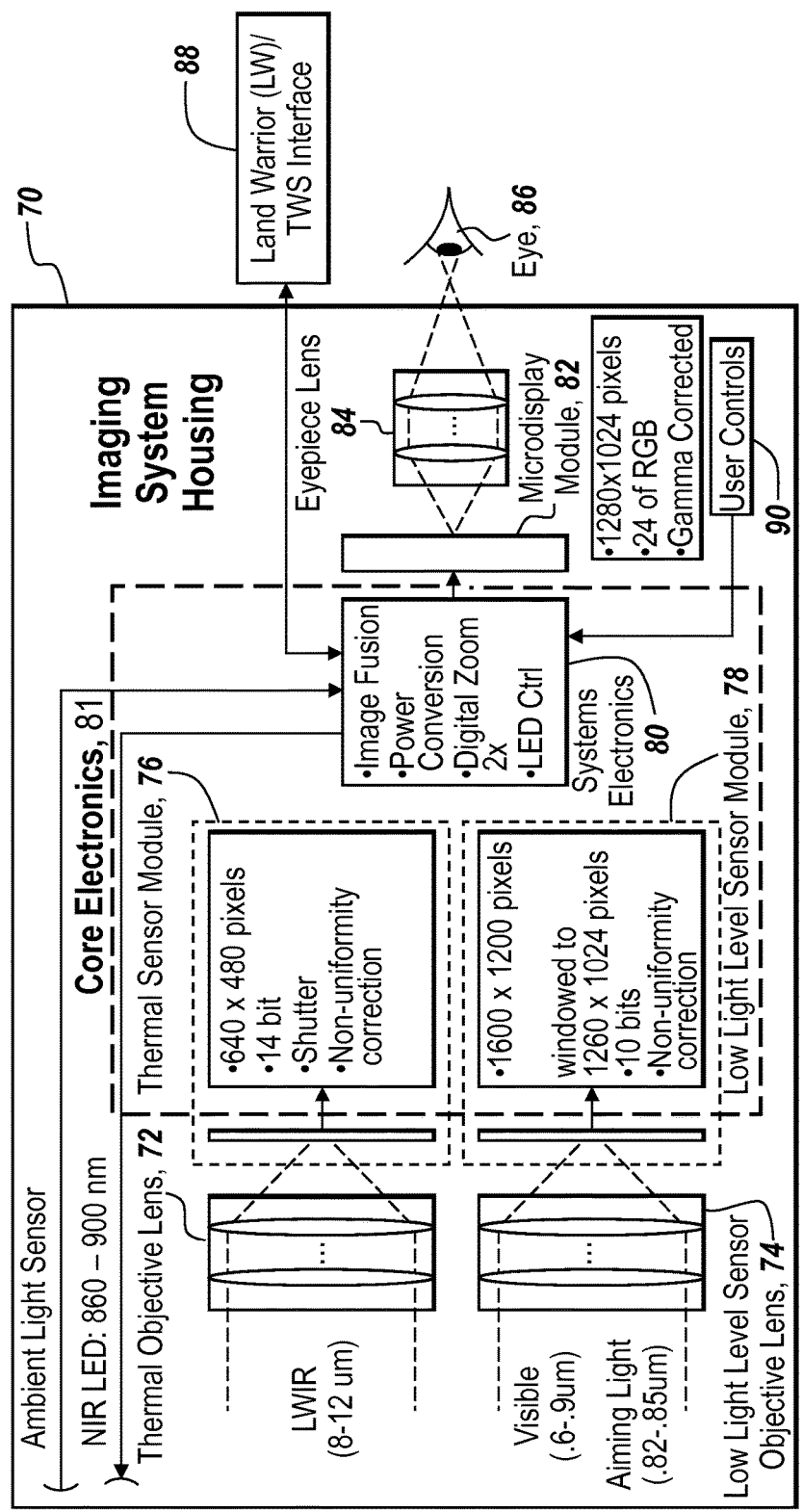
FIG. 4 is an enhanced digital night vision goggle system simplified functional block diagram, in accordance with the first exemplary embodiment of the present disclosure.

FIG. 4 is an enhanced digital night vision goggle system simplified functional block diagram, in accordance with the first exemplary embodiment of the present disclosure. In one embodiment, the present invention is used in an Enhanced digital night vision goggle system, or Enhanced Night Vision Goggle (digital) ENVG (digital) system, that is helmet mounted, battery powered, and uses a monocular Night Vision Goggle (NVG) that collects energy from the scene in multiple bands, converts this energy to electrical signals which are digitally processed, fused and presented in real time as full motion video on a display for viewing by the user. The enhanced digital night vision goggle is intended to provide man portable vision capability suitable to perform dismounted and mounted military missions in all terrains, under all light and visibility conditions.

As can be seen in FIG. 4, the night vision goggle system is housed in an image system housing module 70, which includes a thermal objective lens assembly 72 and visible light lens assembly 74 coupled respectively to a thermal sensor module 76 and a low light level sensor module 78. The outputs of modules 76 and 78 are applied to system electronics 80 that includes image fusion, power conversion, digital zoom electronics, and an LED control. Modules 76, 78 and 80 constitute core electronics 81 for the subject system. The output of system electronics 80 is coupled to a micro display 82 which in one embodiment is a 1280×1024 pixel display having a 24-bit RGB capability which is also gamma corrected. Micro display 82 is viewed by an eyepiece lens assembly 84 such that the result of the image fusion is visible by the naked eye 86. System electronics 80 also includes a land warrior interface 88 and user controls 90, as illustrated.

The enhanced digital night vision goggle forms imagery from scene energy in the following bands at a minimum:
Visible-Near Infrared (VisNIR) 600-900 nm also referred to as Low Light Level (LLL) herein. Primarily using reflected light energy from night sky illumination or artificial sources.
Long Wave Infrared (LWIR) [8-12 µm] also referred to as Thermal or Thermal Infrared (TIR) herein. It primarily uses emitted infrared energy of scene objects.

The system provides a unity magnification, wide Field-Of View (FOV), high resolution, continuous, full motion, and video image of the scene. The system permits the operator to select viewing either of the two bands or the fused product of the two bands. The system is compatible with 820-860 nm laser illuminators and pointers (e.g., AN/PEQ-2 and AN/PAQ-4).

Video Processing Pipeline

Figure 5:
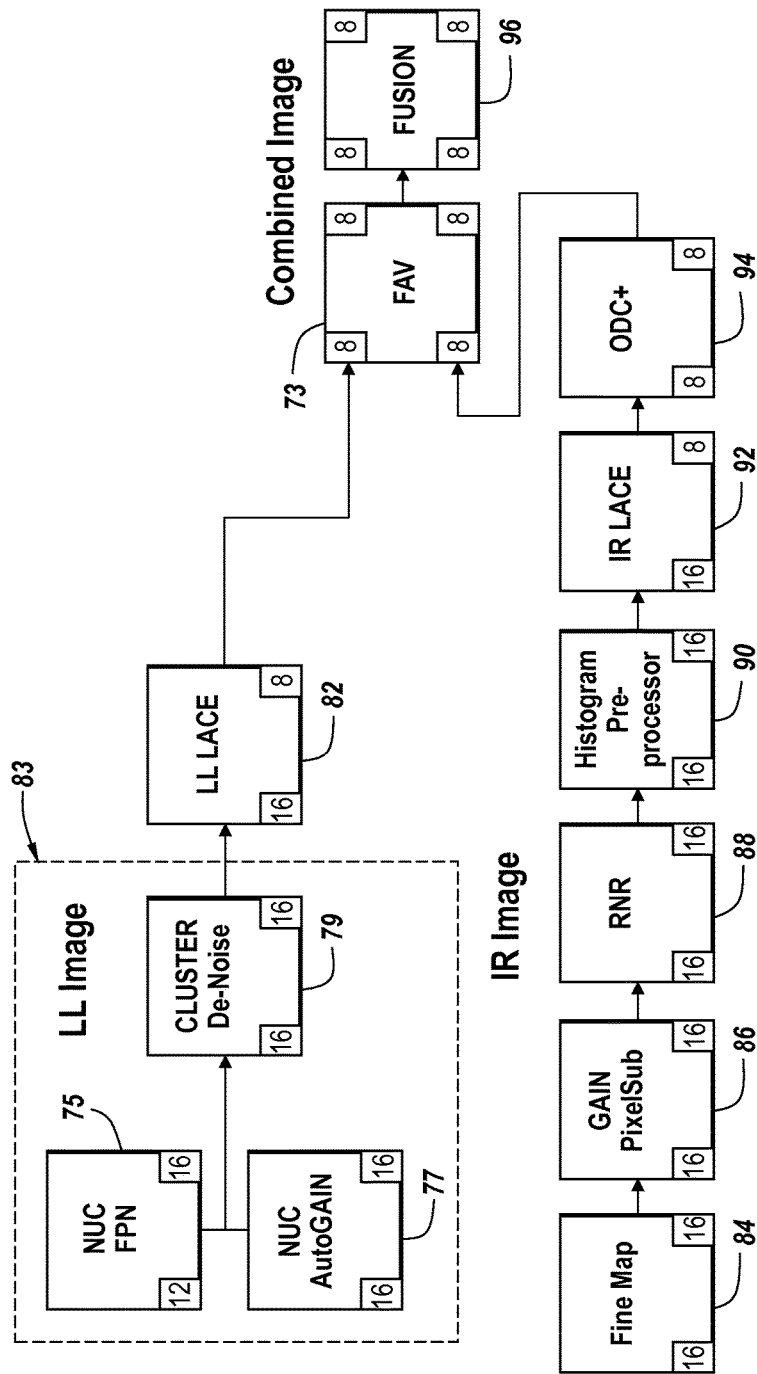
FIG. 5 is a video processing pipeline diagram for the enhanced digital night vision goggle system, in accordance with the first exemplary embodiment of the present disclosure.

FIG. 5 is a video processing pipeline diagram for the enhanced digital night vision goggle system, in accordance with the first exemplary embodiment of the present disclosure.

The enhanced digital night vision goggle video processing pipeline is depicted in FIG. 5, where it can be seen that there is a low light image pipeline and an IR image pipeline. The outputs of these outlines are coupled to a combined image focal actuated vergence parallax correction module 73.

As to the low light image pipeline, incoming light is corrected for fixed pattern noise and constant pixel non-uniformity. Further correction is provided by offset and gain sensor mapping module 75. Also involved is an automatic gain module 77. The outputs of modules 75 and 77 are coupled to a cluster de-noise module 79, with modules 75, 77 and 79, constituting a noise preprocessor 83. It is noted that the cluster de-noise module 79 removes flashing out of the family of pixels in the low light image channel. The output of noise preprocessor 83 is applied to LL LACE module 82 which adds an amount of contrast using histogram techniques. This concentrates on low light level local area contrast enhancement. The output of LL LACE module 82 is coupled to one input of module 73 used in combined image generation.

As to the IR channel, a fine map module 84 is used to correct for non-uniformity related to temperature change or shifts. The output of module 84 is coupled to a gain module 86, which corrects for non-uniformity for each pixel. Module 86 is coupled to row noise rejection module 88, which is used for row noise reduction by normalizing the levels of the rows. This unit is coupled to a histogram preprocessor 90 which does a piecewise linear stretch to spread out most frequent intensity values within segments, and provides more uniform distribution of intensity across the histogram. The output of histogram preprocessor 90 is coupled to IR LACE module 92 which enhances IR local area contrast by pulling out detail from shadows and highlights. The output of IR LACE module 92 is applied to optical distortion correction module 94, in which optical distortion correction between the low light channel and the infrared channel is removed by translation, rotation and magnification. The output of optical distortion correction module 94 is applied to the other input of module 73. The combined image which is the output of module 73 is applied to a fusion module 96 so as to provide preprocessed low light image information and preprocessed IR image information.

More particularly, the functionality of the processing pipelines is now described in more detail:

Low Light Pipeline: NUC FPN

The NUC FPN 75 processing function includes the offset and gain sensor mapping. The offset map corrects for fixed pattern noise including read noise, noise associated with background and dark current. The offset map will also correct for constant pixel non-uniformities. The gain map corrects for pixel response non-uniformity as well as non-uniformity related to the lens. Through the gain operation one allows bit depth to grow to 16 bits.

Low Light Pipeline: NUC AutoGain

The AutoGain module 77 controls the high voltage power supply on the LLL sensor. The major input to this control is light level which is determined through the mean of the LLL image. The high voltage duty cycle is then adjusted with a PID loop so that the best possible response can be achieved. The AutoGain module also includes sensor protection from saturation or damage.

Low Light Pipeline: Cluster De-Noise

The Cluster De-Noise module 79 addresses flashing out of family pixels that are prevalent at very low light levels. A rank order filter is used to determine outlying pixels and they are then filtered out. This is a proven technique used in the visible camera industry to reduce noise.

Low Light Pipeline: LL LACE

LL LACE module 82 is primarily adding an amount of contrast in the image. The block operates on both a global and local level to enhance the contrast in the image. This operation is performed using a filter kernel and a global histogram stretch. The image is reduced to 8 bits during this operation.

Thermal Pipeline: Fine Map

In the IR image pipeline, the fine map module 84 processing involves a thermal calibration done using the system shutter. The goal of the fine map is to correct for non-uniformity related to temperature change or system drift. Given the extreme sensitivity of the thermal sensor this map is required to be adjusted as the system operates.

Thermal Pipeline: Gain Map

The Gain Map processing shown at 86 is a thermal calibration done during system build. The gain operation corrects for response non-uniformity for each pixel. The bit depth of the image goes from 14 bit to 16 bit in this step. The gain map also has the ability to substitute and replace unresponsive pixels.

Thermal Pipeline: RNR

The RNR (Row Noise Reduction) module 88 processing is an algorithm that normalizes the level of the rows locally.

Thermal Pipeline: Histogram Preprocessor

The Histogram Preprocessor module 90 is essentially a Piecewise Linear Stretch of the histogram of the incoming image. In this approach, the histogram of the incoming image is divided into eight (8) segments, and each segment is stretched using a linear function to spread out the more densely populated sections of the histogram over the entire segment. This essentially provides a more uniform distribution of intensity across the histogram, in preparation for contrast enhancement.

Thermal Pipeline: IR LACE

IR LACE module 92 is primarily for adjusting the amount of contrast in the image. The block operates on both a global and local level to enhance the contrast, pulling out detail from the shadows and highlights. This operation is performed using a filter kernel and a global histogram stretch. The image is reduced to 8 bits during this operation.

Thermal Pipeline: ODC+

The optical distortion correction module 94 processing corrects for mechanical and optical differences between the LLL subsystem and the IR subsystem. Corrections include translation, rotation, magnification and distortion mismatch.

Combined Pipeline: FAV

The FAV (Focal Actuated Vergence) module 73 processing contains a technique employed to correct for parallax errors between the LLL and IR subsystems. This algorithm adjusts the vertical offset on the thermal image based on the focus point of the LLL lens. This provides proper alignment for any part of the image that is in focus.

Combined Pipeline: Fusion

Within the enhanced digital night vision goggle video processing pipeline, the Fusion algorithm in fusion module 96 provides Target Cueing (TC) and Situational Awareness (SA) under all weather and illumination conditions utilizing numerically efficient methods chosen to provide low-SWAP and low latency.

The Fusion algorithm utilizes metrics provided by the low light level (LLL) and thermal pipelines to adapt to dynamic scenes. The contrast detector located in LLL LACE utilizes several Signal to Noise Ratio (SNR) metrics to determine how much to rely on the LLL and the thermal sensors for the situation awareness channel. In relatively high light conditions, almost the entire situational awareness image is mapped from the LLL sensor. As lighting conditions deteriorate, the LLL SNR decreases, the LLL sensor contribution is decreased and thermal sensor data fills the gap maintaining high situational awareness resolution and capability.

What is now discussed is the algorithm utilized for the histogram preprocessor utilized in the IR channel.

Histogram Pre-Processor (Piecewise Dynamic Range Reduction)

An algorithm used for the histogram pre-processing of the IR channel before local area contrast enhancement (LACE) is applied. The purpose of this preprocessing is both to analyze the distribution of the pixel values in the image for use in contrast enhancement and also to scale the distribution to reduce problems associated with large dynamic range distributions. Such conditions can be due to very hot objects or regions with large differences in average temperature, such as a warm forest in the foreground with a cold sky in the background. These conditions are known as bimodal distributions due the separation of the histogram for such images into two distinct Gaussian-like distributions, often with a large gap between them. Proper adjustment of the dynamic range of the image in such cases permits effective processing by subsequent algorithms to properly enhance the fine detail in the different regions and prevents over-saturating the values in bright regions and washing out darker regions.

To this end a piecewise histogram scaling method compresses regions of the distribution that are sparsely populated, such as the gaps between the distributions in a bimodal case, and expands regions that are densely populated. Additionally, the method is designed to restrict the expansion of dynamic range values so as to minimize the amplification of noise and creation of artifacts, which is a weakness of the standard histogram-based global contrast enhancement techniques such as plateau equalization. The technique also has the advantage that it does not exhibit large variations in illumination as the brightness of the scene varies and it does not create significant flickering in video sequences compared to other histogram based techniques. All the same, it retains the overall simplicity and a low burden of processing requirements commonly associated with such global methods.

Algorithm Details

The algorithm involves four major steps in the processing:

1. Histogram Development—First, the histogram of the image is calculated using 4 k bins over the entire 16-bit range of possible values in the image. This histogram actually comes from the previous frame in the hardware implementation due to the low-latency requirements of the goggle.

2. Segmentation of the Histogram—Next, the distribution is segmented into K points which determine the illumination levels at discrete values of the population. The distribution of these points gives an indication of the dynamic range regions which are either densely or sparsely populated, thereby indicating where one must compress the dynamic range and where one must expand the dynamic range.

3. Dynamic Range Specification—Then, the lengths of each segment are used to determine whether compression or expansion of the dynamic range is used for that interval. Based on that, the value of the length of each segment for the final image distribution is determined by a simple histogram specification procedure. From this, the offset values and scaling coefficient for each interval can be calculated.

4. Piecewise Scaling—Finally, the values of each of the pixels in the image are adjusted by a scaling procedure which uses the offset values and scaling coefficients.

Histogram Development

First, the histogram of the image is calculated using 4 k bins over the entire 16-bit range of possible values in the image. This histogram actually comes from the previous frame in the hardware implementation due to the low-latency requirements of the goggle. The requirement for number of bins comes from the fact that one needs to accurately characterize the distribution for the scaling procedure, without overly burdening the processing requirements. Generally speaking, a properly imaged region will have a dynamic range on the order of 512 values, so the quantization of the values by 16 results in roughly 32 bins over such regions, which provides sufficient resolution of the various dynamic-range regions to allow for accurate segmentation and scaling of the values. Also, for one implementation one uses only a bin every $4^{th}$ pixel to reduce the memory requirement of the histogram buffer to an acceptable level.

Segmentation of the Histogram

Next, the distribution is segmented into K (equals 32 for the implementation) points which determine the illumination levels at discrete values of the population. The segmentation of the dynamic range distribution is based upon finding the discrete values in the dynamic range that correspond to certain predetermined values of the pixel population. To this end, one first creates the cumulative distribution function from the histogram in the usual way. Next, one determines the segmentation points using the following equation:

$$CDF(L_k^t) = \sum_{i=L_{min}}^{L_k} H(i) = C_k^t \qquad \text{Equation 1}$$

In this equation, the $k^{th}$ segmentation value $L_k^t$ is determined as the value for which the CDF equals the $k^{th}$ threshold value $C_k^t$. The threshold value is defined by:

$$C_k^t = F_k^t \times CDF(L_{max}) \qquad \text{Equation 2}$$

The distribution of the threshold factors $_k$ is a configuration table for the current implementation, $F^t$, and was and was originally chosen to be a linearly spaced set of values from 0 to 1. However, it was found that a logarithmically distributed set of values worked better.

An important issue is the determination of the extreme values of the image distribution to decide how to clip the minimum and maximum values to reduce the effects of outliers on the overall scaling of the illumination and brightness. This is determined by the values of the first and last thresholds, which were set to:

$$F_{lower}^{clip} = 0.005, F_{upper}^{clip} = 0.98 \qquad \text{Equation 3}$$

These values were based on thresholds used for previous versions of our contrast enhancement algorithms that worked well for the enhanced digital night vision goggle.

The current implementation uses 32 segment points, which provides a decent balance between simplicity and effectiveness. Originally, 8 values were used which worked well enough to prove the concept but resulted in unacceptable amounts of artifacts due to the coarseness of the scaling. An illustration of this segmentation for 8 points is given in FIG. 6.

Figure 6:
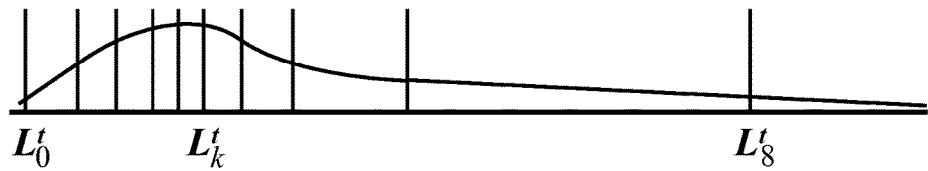
FIG. 6 is an illustration of histogram segmentation, in accordance with the first exemplary embodiment of the present disclosure.

FIG. 6 is an illustration of histogram segmentation, in accordance with the first exemplary embodiment of the present disclosure. This sort of distribution is typical for cases where a hot object such as a light is in the image, and in fact the long tail is typically several orders of magnitude larger than the distribution of the "hump" which contains most of the interesting image detail. Simple clipping of such an image will not solve the problem due to the fact that the hot object may occupy a significant proportion of the image.

Now that one has the segmentation of the image distribution, it is necessary to decide how the distribution should be scaled. This is accomplished by first determining the values of the distribution points for the corrected image.

Dynamic Range Specification

The next step in the process is to determine the scaling and offsets for each interval. This is accomplished by mapping the dynamic range segments identified by the segmentation procedure onto a "canonical grid" which represents some ideal distribution. This is actually a form of histogram specification, although the specification used was somewhat heuristic and was chosen based on observation of the distributions of a variety of well-formed IR images which did not have dynamic range issues. Another issue that influences the specification was the desire to not over enhance the values of the dynamic range at lower temperatures, which typically results in amplification of undesirable spatial noise.

Figure 7:
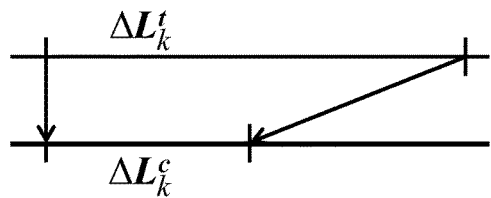
FIG. 7 is an illustration of compression of dynamic range segments, in accordance with the first exemplary embodiment of the present disclosure.
Figure 8:
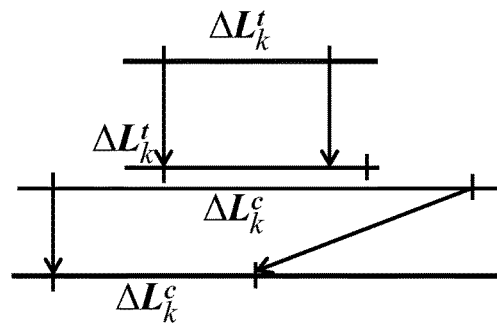
FIG. 8 is an illustration of expansion of dynamic range segments, in accordance with the first exemplary embodiment of the present disclosure.

FIG. 7 is an illustration of compression of dynamic range segments, in accordance with the first exemplary embodiment of the present disclosure. FIG. 8 is an illustration of expansion of dynamic range segments, in accordance with the first exemplary embodiment of the present disclosure. The most important contribution of the algorithm is the compression of large dynamical range segments that have little or no image information, which is illustrated in FIG. 7. The interval $\Delta L_k^t$ is the difference between the levels $L_k^t$ and $L_{k-1}^t$ which were shown in FIG. 6. For example shown here, the $k^{th}$ segment is larger than the canonical segment $\Delta L_k^c$. The scaling of this interval based on the ratio of the 2 intervals is also determined, as well as described in more detail below. First, what is explained is how to handle the opposite case for which the original segment is smaller than the canonical segment as illustrated in FIG. 8.

In this case the condition would suggest expansion of the interval. However, experience with this was mostly negative, as this frequently leads to amplification of spatial noise in the image, while yielding only modest benefits in terms of contrast enhancement (in general). Thus, it was decided for this version of the algorithm to just leave the segment length alone for this case, as the improvements due to dynamic range compression was the pressing issue.

The result of this step of processing is simply the choice of the final scaled interval size for each segment. This can be summarized by the formula:

$$\Delta L_k^s = L_k^s - L_{k-1}^s = \min(\Delta L_k^t, \Delta L_k^c) \qquad \text{Equation 4}$$

In this formula $\Delta L_k^s$ is the value of the final scaled interval, $\Delta L_k^t$ is the value of the un-scaled, original interval found by the segmentation procedure, and $\Delta L_k^c$ is the value of the "canonical" or pre-specified segment interval which is a configuration value stored in a look-up table for the hardware implementation Piecewise Scaling Once one has the segments of the original distribution and values for the final dynamic range intervals, the calculation of the offsets and scaling coefficients for each segment is based on simple linear scaling. The formula for this is given by:

$$F_{x,y}^s = S_k(F_{x,y}^u - L_k^t) + L_k^s \qquad \text{Equation 5}$$

Here, $F_{x,y}^s$ is the final scaled pixel value, $F_{x,y}^u$ is the original un-scaled value, $L_k^t$ is the value of the segment point that is just less than the original pixel value, and $L_k^s$ is the new offset for that segment. The scaling factor is given by the ratio of the scaled to un-scaled interval for that segment.

$$S_k = \frac{L_k^s - L_{k-1}^s}{L_k^t - L_{k-1}^t} \qquad \text{Equation 6}$$

The scaled offsets are simply the accumulation of the values of the interval sizes for all of the segments below that segment:

$$L_k^s = \sum_{j=0}^{j=k-1} \Delta L_k^s \qquad \text{Equation 7}$$

The value of the first offset is arbitrary, and is chosen to be the value of the lower clip value of the original distribution for simplicity. Another obvious choice would be to set it equal to zero.

Imagery Examples

Several example images comparing the previous goggle algorithm with the new algorithm are shown below. These examples show how the method solves a couple of important problems for large dynamic range imagery.

Figure 9:
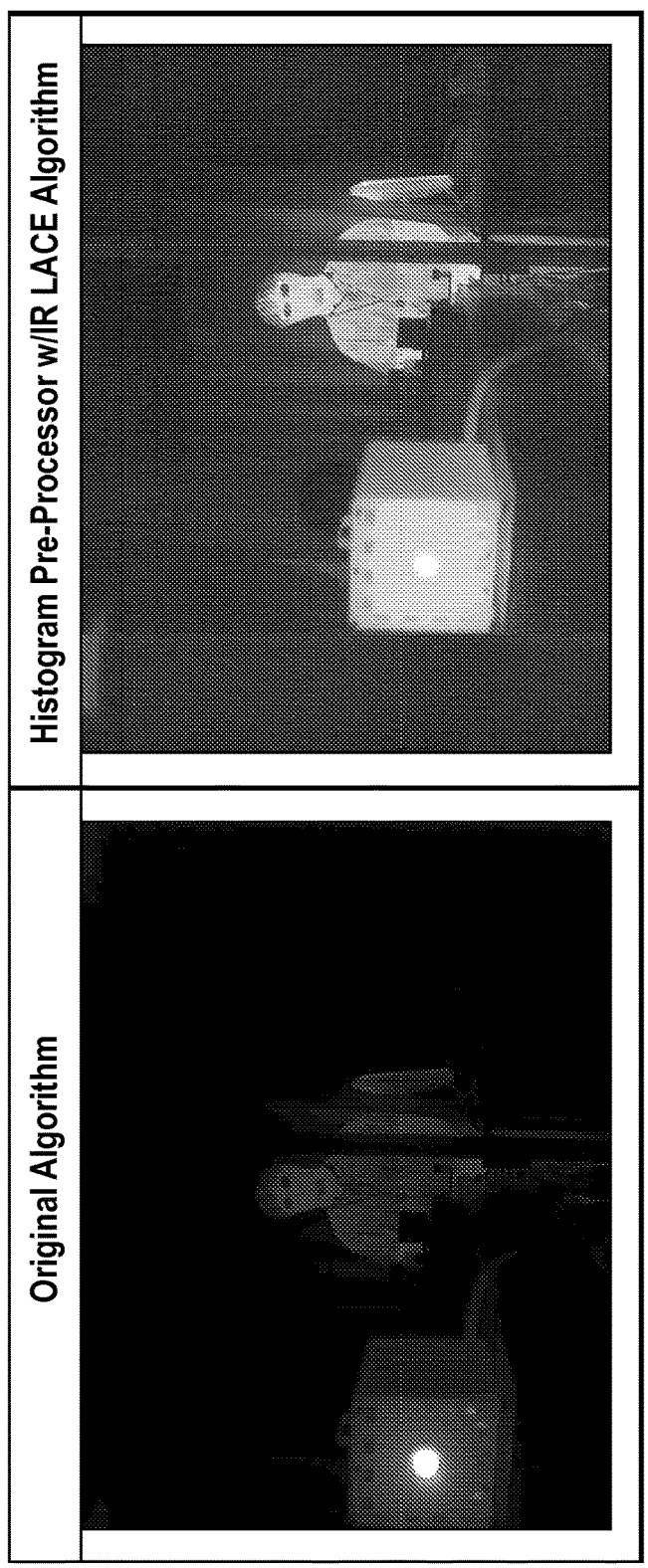
FIG. 9 is a histogram pre-processor with IR LACE example image—dark lab w/hot objections, in accordance with the first exemplary embodiment of the present disclosure.
Figure 10:
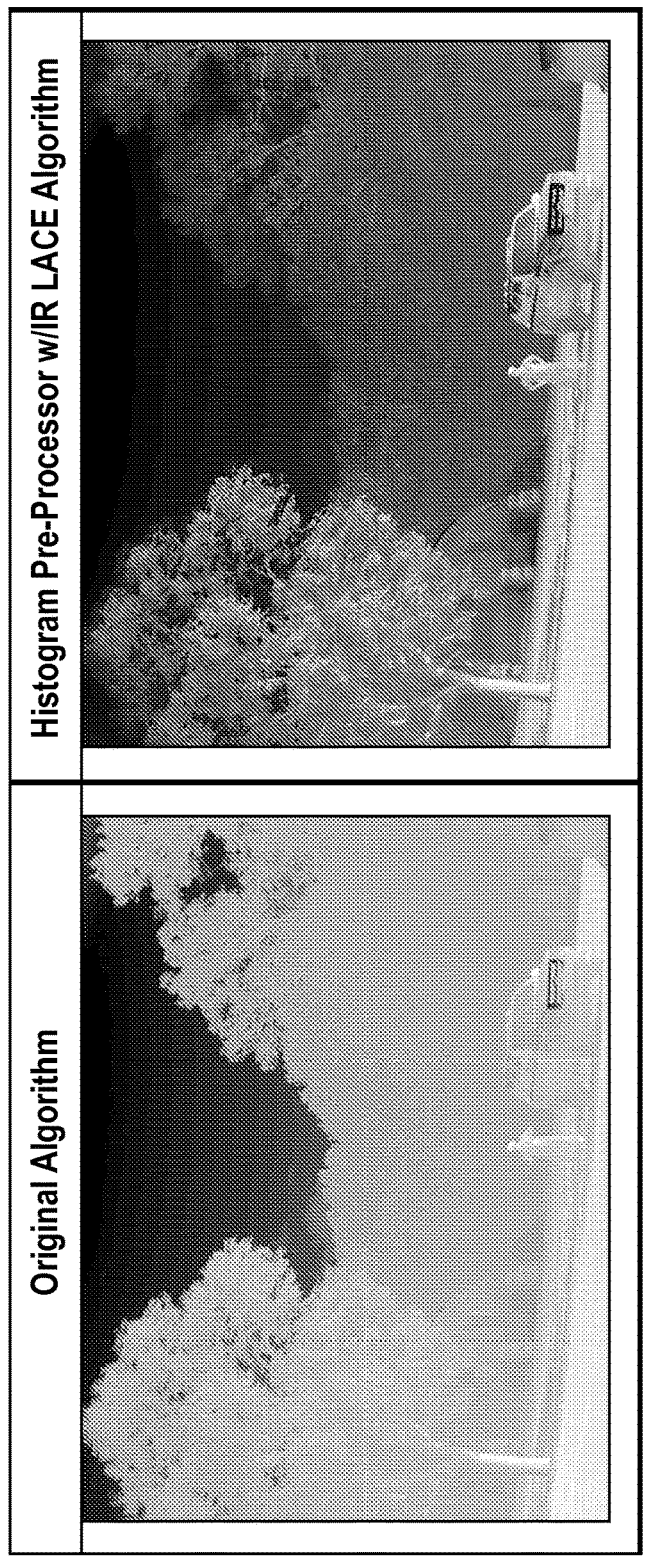
FIG. 10 is a histogram pre-processor w/IR LACE example image cold sky, in accordance with the first exemplary embodiment of the present disclosure.

FIG. 9 is a histogram pre-processor with IR LACE example image—dark lab w/hot objections, in accordance with the first exemplary embodiment of the present disclosure. FIG. 10 is a histogram pre-processor w/IR LACE example image cold sky, in accordance with the first exemplary embodiment of the present disclosure. The first example shows how the algorithm solves the problem of very hot objects in an image causing fade in the detail for the rest of the image, thereby masking other objects such as a person. The original contrast enhancement algorithm did not handle this case well as shown by the image collected from the goggle on the left of FIG. 9, while the right hand side shows the new pre-processing algorithm implementation.

Another important case is that of a warm foreground with a cold background. Here, what is shown is an image of a scene with interesting objects which is degraded due to the cold sky causing contrast reduction in the warmer foreground (left-hand side of FIG. 10), and the same scene with the preprocessor active (right-hand side of FIG. 10).

As illustrated in this case, many details that were completely washed out are now visible, and the person is clearly visible.

Context-Based Fusion, Weighting Based on Structural Information

Different smoothly varying blends of low light level (LLL) images and thermal (IR) images were evaluated in order to create a fused image for the goggle. The objective of the investigation was to address several user-identified deficiencies in the existing algorithm—primarily to provide more thermal in areas where the visible contrast is low. Low visible contrast primarily happens when the light level is very low (inside dense foliage, buildings, or tunnels) or when there is smoke or fog. The final blending algorithm was a function of the contrast for each image type, where contrast is defined as the standard deviation of the image. Blending gives more weight to the image type with the most structural information as measured by the standard deviation of that image.

Algorithm Approach

The subject system produces two image modalities (visible and thermal) and has three color planes (Red, Green, and Blue) to display the information. Using the theory of opponent colors, the fused image color scheme was designed to provide specific information regarding the scene based on colorization. Constraints were placed on the image color scheme, including:

The primary situation awareness information should be shades of Green or hues close to Green.

Red colors are reserved for "hot" thermal targets.

Based on these constraints, the Green channel was designated to contain the primary situation awareness information. Soldiers trained in the use of photon-intensified low light cameras are used to seeing a Green image. Therefore, subject goggle should provide familiar images that are primarily Green, but enhanced with Red to indicate targets, yellow to indicate higher levels of thermal, and Blues to indicate higher levels of visible light. In order to accomplish this, the Green channel is composed of a blend of visible and thermal imagery. The Red channel contains the thermal image with each pixel limited to one half of the Green pixel level, providing shades of Green to yellow. The Blue channel shows the greater of excess visible over the thermal or one quarter of visible with each pixel limited to one half of the Green pixel level, thus providing shades of Blue. The reason Blue is an excess level is to prevent the colors from all being white when thermal and visible levels are similar. This coloring scheme provides the following perceptual information:

- If thermal values exceed the IR threshold, the pixels are colored Red to indicate a "hot" target. The pixel values are shades of Red in low levels of visible light and turn orange-yellow as the visible light level increases.
- In very low light levels, the Green channel is mainly composed of enhanced thermal combined with a fraction of the visible light image (minimize the speckle while still showing strong lasers).
- As the visible light level increases, Green is composed of a blend of the visible image mixed with a fraction of the thermal image.
- The Red channel contains the thermal image and each pixel level is bounded by G/2. Yellow in the fused image indicates areas where the thermal image is stronger than the visible image.
- The Blue channel is the excess of visible over thermal and bounded by <LL/4 . . . G/2>. Blue or purple in the fused image indicates areas where the visible image is much stronger than the thermal image.

Algorithm Details

The primary algorithm effort involved finding a smooth function to blend visible images with thermal in the Green channel based on their respective contrast levels. Since standard deviation is directly related to contrast, the robust average deviation of the image was calculated:

$$ADEV = \frac{1}{N} \sum_{i=1}^{N} |x(i) - \mu| \qquad \text{Equation 8}$$

where N is the number of pixels, x(i) is the ith pixel level, and μ is the mean value of the image. In one embodiment, the average deviation was calculated for both the pre-LACE visible and pre-LACE thermal images. In order to calculate the average deviation for the thermal image with dimensions 640×480 and not using any divides, only 640×410 pixels were used and result was shifted by 18 (divided by 512*512):

$$ADEV_{IR} = \frac{1}{512*512} \sum_{i=36}^{445} \sum_{j=1}^{640} |I_{IR}(i,j) - \mu_{IR}| \qquad \text{Equation 9}$$

A Matlab code segment to calculate the mean and average deviation for the visible images is shown in Exhibit 1.

Exhibit 1: Matlab code for average deviation of visible image
% Average Deviation Code for LL

```
Nr = 1024;              % Number of rows in LL image
Nc = 1280;              % Number of columns in LL image
nBitShiftLL = -20;      % Divide by 1024*1024
% Compute the average value of LL NUC
mLL = 0;
for i = 1:Nr % for each row
    for j = 1:Nc % For each pixel in each col
        mLL = mLL + LL(i,j);
    end
end
mLL = bitshift(mLL, nBitShiftLL); % Mean LL RNR
% Compute the average deviation of LL NUC
sLL = 0;
for i = 1:Nr % for each row
    for j = 1:Nc % For each pixel in each col
        sLL = sLL + abs(LL(i,j)-mLL);
    end
end
sLL = bitshift(sLL, nBitShiftLL); % ADEV LL NUC
```

A Matlab code segment to calculate the mean and average deviation for the thermal images is shown in Exhibit 2.

Exhibit 2: Matlab code for average deviation of thermal image
% Average Deviation Code for IR

```
Nr1 = 36;               % Start row in IR RNR image
NR2 = 445;              % End row in IR RNR image
NcIR = 640;             % Number of columns in IR image
nBitShiftIR = -18;      % Divide by 512*512
% Compute the average value of IR RNR
mIR = 0;
for i = Nr1:Nr2 % for each row
    for j = 1:NcIR % For each pixel in each col
        mIR = mIR + IR(i,j);
    end
end
mIR = bitshift(mIR,nBitShiftNR); % Mean IR RNR
% Compute the average deviation of IR RNR
sIR = 0;
for i = Nr1:Nr2 % for each row
    for j = 1:NcIR % For each pixel in each col
        sIR = sIR + abs(IR(i,j)-mIR);
    end
end
sIR = bitshift(sIR,nBitShiftIR); % ADEV IR RNR
```

Contrast-based fusion uses the estimates of the average deviations to blend visible and thermal images into the Green channel. The complete fusion algorithm using these estimates is shown in the table in Exhibit 3.

Exhibit 3: Matlab code for fusion
% Contrast-Based Fusion Algorithm

```
if IR > Thresh_sig % IR threat
    R = I_IRL
    G = I_LLL/2
    B = 0
else % in background
    G = min(W_LL*I_LLL + W_IR*I_IRL,255)
    R = min(mI_IRL,.5*G)
```

Exhibit 3: Matlab code for fusion
% Contrast-Based Fusion Algorithm

```
    B = min(max((I_LLL-I_IRL,0.25*I_LLL),.5*G)
end
Where
    W_LL = min(m_LL/16+.5,1)
    W_G = min(max(64/(s_IR+s_LL),.3),1.25)
    W_IR = W_G*s_IR/(s_IR+s_LL)
    s_IR = IR average deviation
    s_LL = LL average deviation
    m_LL = LL mean value
```

If the raw thermal pixels exceed a user-controlled threshold, those pixels are colored a shade of Red. The Red channel is set to the thermal image intensity, while the Green channel is set to half the intensity of the visible image in which targets get an orange hue in strong visible light.

Images with thermal pixel values less than the target threshold provide situation awareness, with the primary information in the Green channel. The Red channel provides yellow hues where the thermal image is high, while the Blue channel provides Blues and purples in regions where visible intensities exceed thermal intensities. The function for the Green channel enhances the thermal a little and diminishes visible a little when visible contrast is low. The following gain function was used to weight the thermal image based on the contrast of the two images:

$$W_G = \min(\max(64/(s_{IR}+s_{LL}),0.3),1.25) \quad \text{Equation 10}$$

The resulting values are placed in a lookup table and shifted to the left by 24 samples:

$$WgLUT = \min(\max(64./(1:256),0.3),1.25); \quad \text{Equation 11}$$

$$WgLUT(1:233) = WgLUT(24:256) \quad \text{Equation 12}$$

Figure 11:
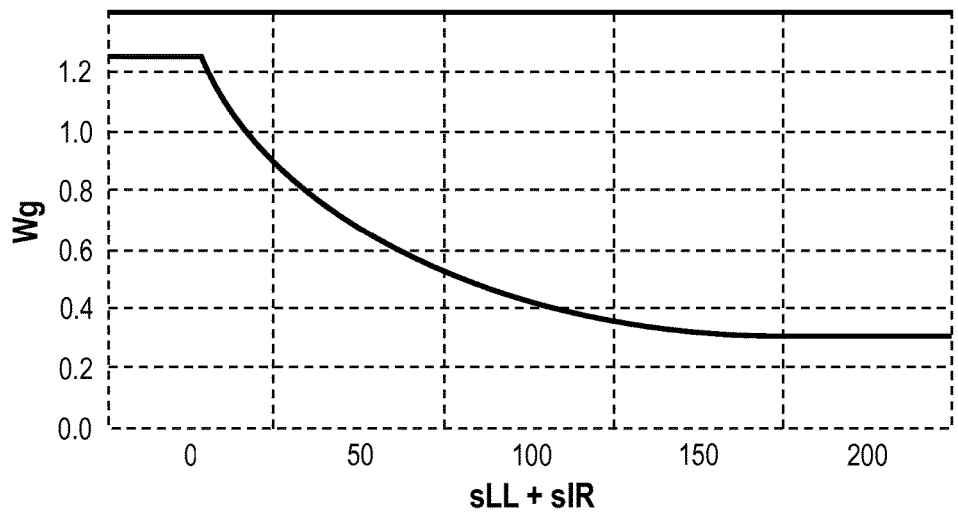
FIG. 11 is a Green gain function for the IR channel, in accordance with the first exemplary embodiment of the present disclosure.

FIG. 11 is a Green gain function for the IR channel, in accordance with the first exemplary embodiment of the present disclosure, and shows a plot of this function.

The thermal weighting function for the Green blend is:

$$W_{IR} = W_G * s_{IR}/(s_{IR}+s_{LL}) \quad \text{Equation 13}$$

The complete lookup table implementation of this algorithm is calculated as shown in Exhibit 4.

Exhibit 4: Matlab code to develop lookup table for IR Green Gain Function

```
% Compute the green gain function
iG = max (sLL+sIR,1) % index must be at least 1
iG = min(iG,128); % maximum index range is 128
WgLUT = min(max(64./(1:256),.3),1.25);
WgLUT(1:233) = WgLUT(24:256);
Wg = ggLUT(iG);
% Compute the IR weighting function
D = max (sLL+sIR,1); % Denom must be at least 1
D = min(D,1024); % Force range to a maximum value
Wir = Wg*sIR/D; % One mult and one div
```

Figure 12:
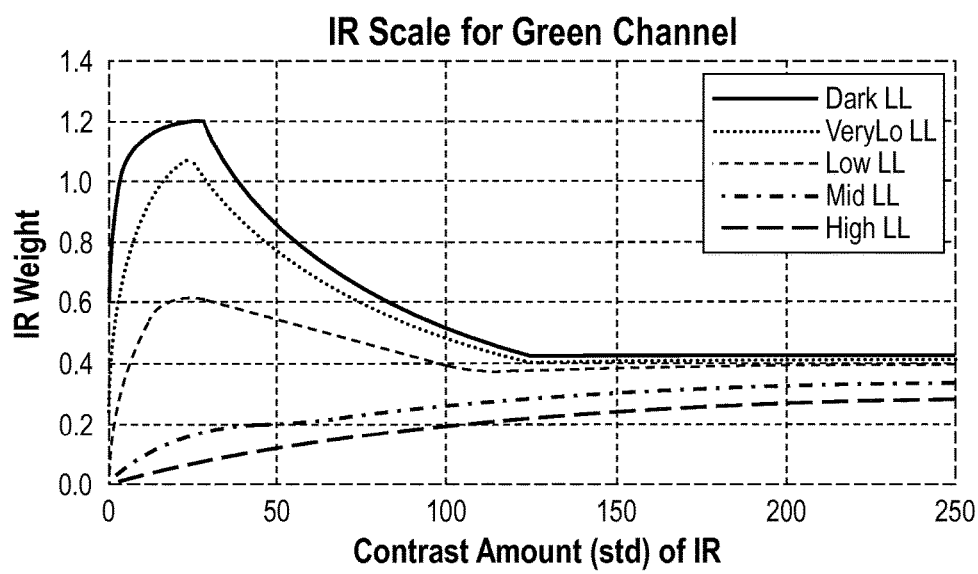
FIG. 12 is an IR scale for the Green channel, in accordance with the first exemplary embodiment of the present disclosure.

FIG. 12 is an IR scale for the Green channel, in accordance with the first exemplary embodiment of the present disclosure. The resulting IR weighting for various levels of visible contrast are shown in FIG. 12. The visible image is gradually reduced in intensity when the light level is very low. The purpose of this weighting function is to reduce image speckle where there is little information, but still allow strong laser pointers or spot lights to be clearly seen.

The weighting function for the visible image in the Green channel is a function of the mean value of the image:

$$W_{LL} = \min(m_{LL}/16+0.5,1)$$

Figure 13:
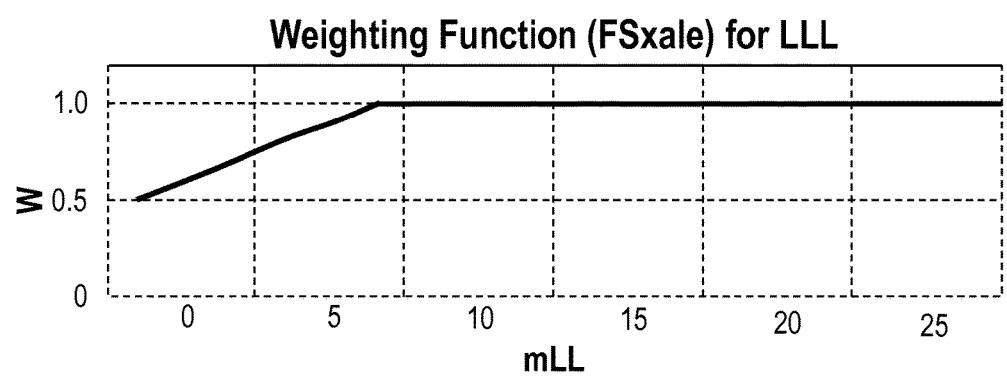
FIG. 13 is a weighting function for the low light level channel, in accordance with the first exemplary embodiment of the present disclosure.

This weighting function is shown in FIG. 13, which depicts a weighting function for the low light level channel, in accordance with the first exemplary embodiment of the present disclosure.

Imagery Examples

Figure 14:
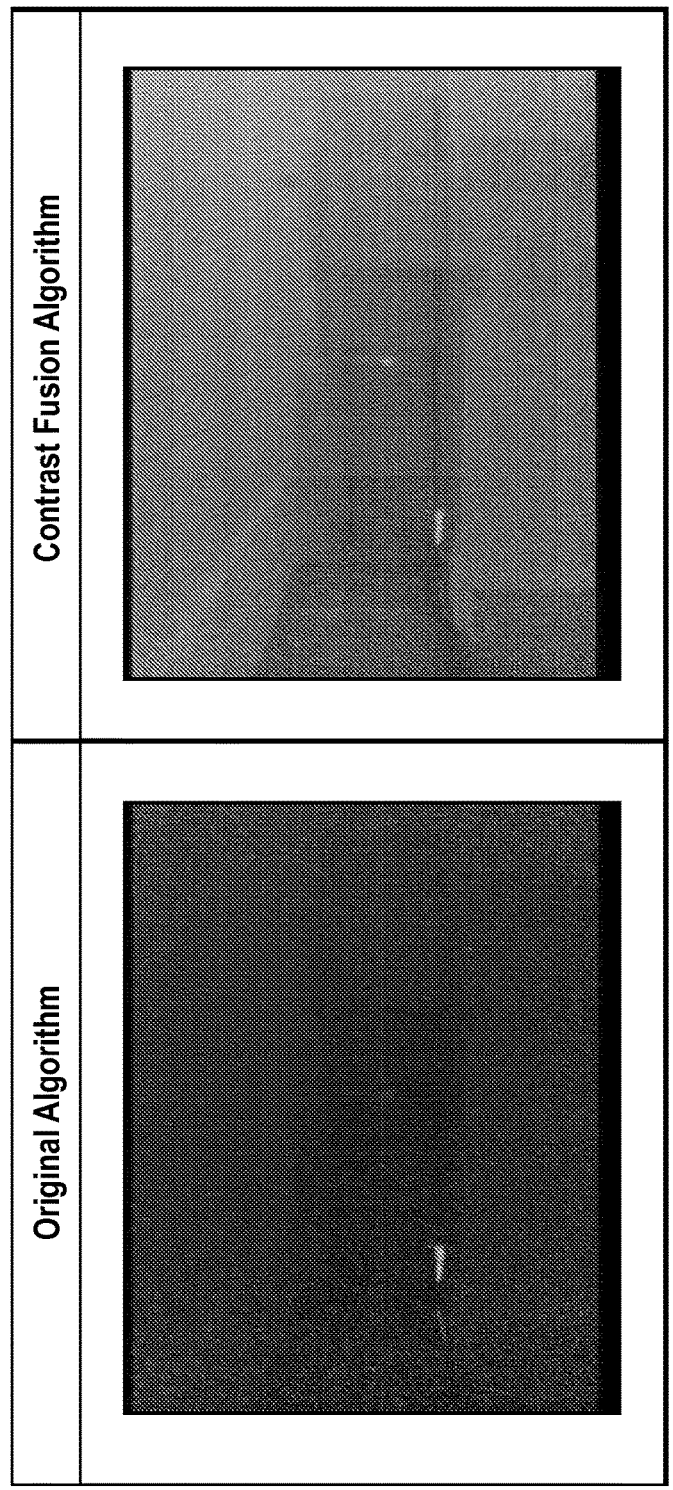
FIG. 14 is a fusion example image—dark lab, in accordance with the first exemplary embodiment of the present disclosure.

Several example images comparing the previous goggle algorithm with the new algorithm are shown below. These examples show the corner cases of the algorithm. The first example in FIG. 14, which is a fusion example image—dark lab, in accordance with the first exemplary embodiment of the present disclosure, is a very low light level image taken in a darkroom with the following statistics:

$$\mu LL=0.72, \sigma LL=5, \sigma IR=19$$

The original goggle algorithm on the left has little thermal, has lots of visible speckle, and a strong light under the door. The new algorithm on the right provides a good blend of enhanced IR, reduces the visible speckle, but preserves the strong light under the door.

Figure 15:
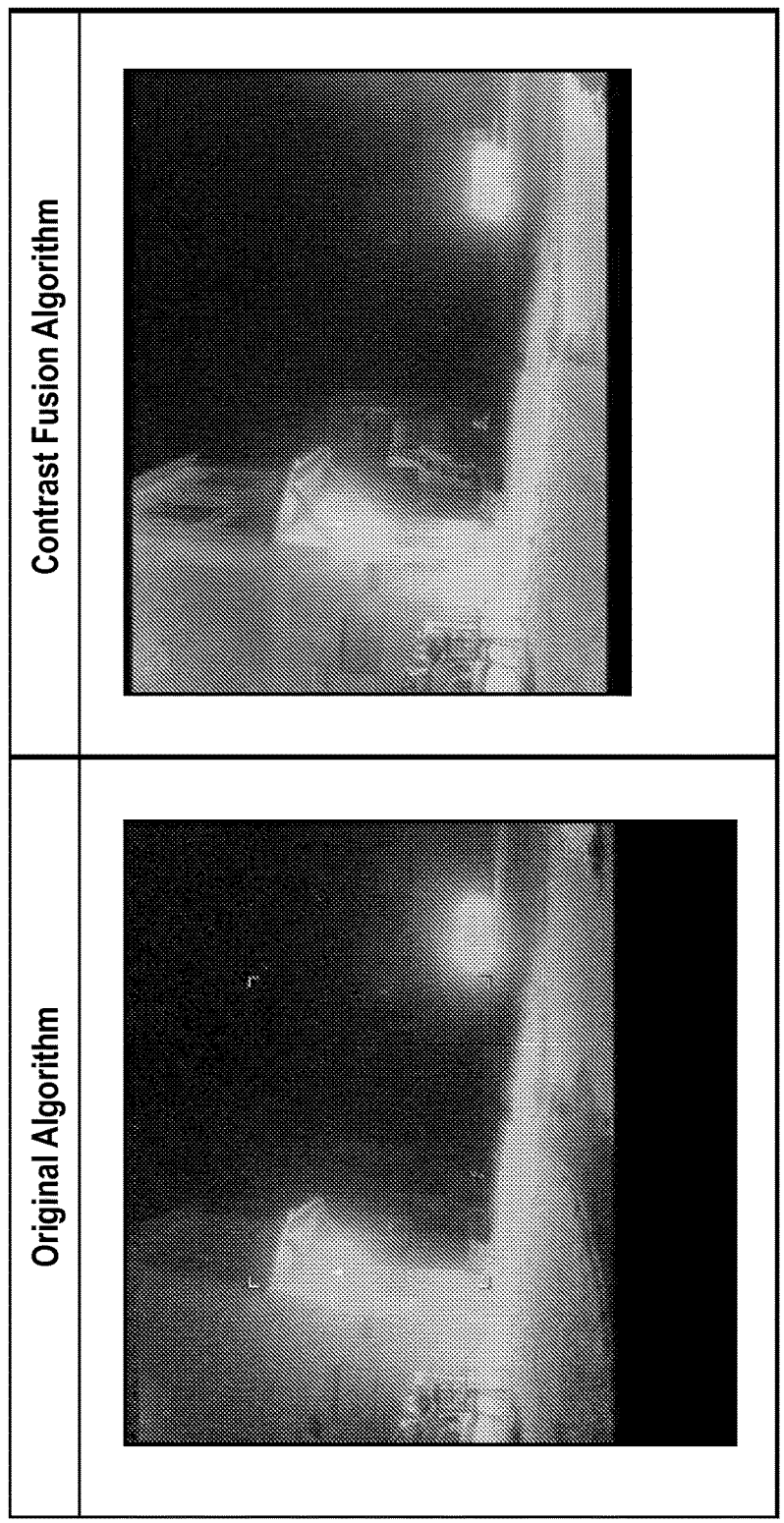
FIG. 15 is a fusion example image—mixed illumination, in accordance with the first exemplary embodiment of the present disclosure.

The next example of FIG. 15, which is a fusion example image—mixed illumination, in accordance with the first exemplary embodiment of the present disclosure, shows the strong thermal being blended in to the image even when there is relatively strong visible. In this case, the bright visible lights are still evident around the porch light and the headlights, but the details in the thermal background are also brought out in shades of yellow and Green. The image statistics are:

$$\mu LL=65, \sigma LL=96, \sigma IR=254$$

Figure 16:
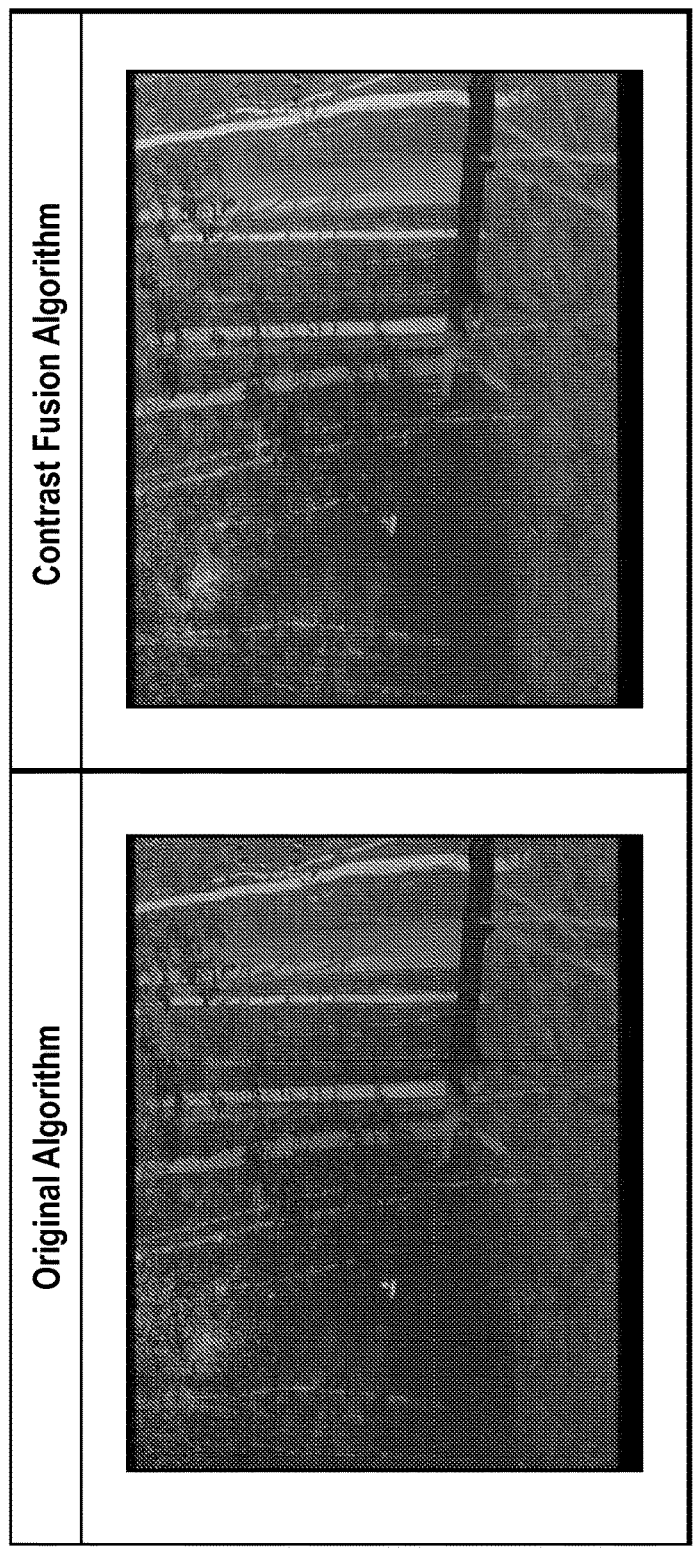
FIG. 16 is a fusion example image—dark woods, in accordance with the first exemplary embodiment of the present disclosure.

The following example of FIG. 16, which is a fusion example image—dark woods, in accordance with the first exemplary embodiment of the present disclosure, was taken in the woods and the visible light was artificially lowered. The scene is primarily thermal, but there is a strong laser light in the middle left. Contrast fusion preserves the Green channel for situation awareness and uses shades of yellow to indicate strong thermal in the image. The statistics for the images are:

$$\mu LL=0.3, \sigma LL=1, \sigma IR=56$$

Figure 17:
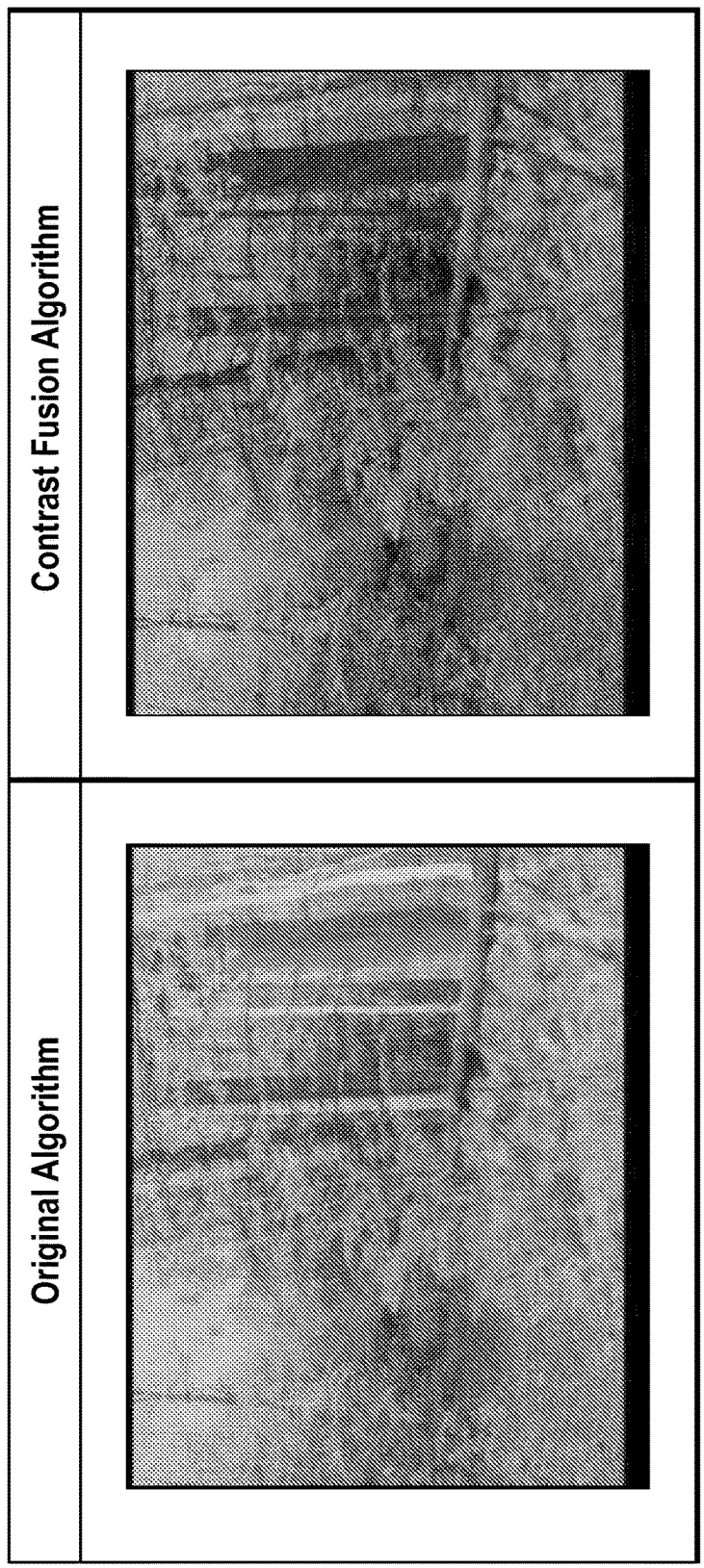
FIG. 17 is a fusion example image—lighted woods, in accordance with the first exemplary embodiment of the present disclosure.

The same scene in much strong light is shown in FIG. 17, which is a fusion example image—lighted woods, in accordance with the first exemplary embodiment of the present disclosure. The image is primarily visible, but the thermal is fused in at a lower level. The image statistics are:

$$\mu LL=175, \sigma LL=83, \sigma IR=56$$

It will be appreciated that the new contrast-based fusion algorithm uses a blending algorithm that gives more weight to image types (thermal or low light level) that have the most structural content. The new algorithm maximizes the scene information content, providing more detail in low contrast areas (inside buildings, caves, or under tunnels), or in washed out areas (in the presence of strong lights, in smoke, or in fog).

While the present invention has been described in connection with the preferred embodiments of the various Figures, it is to be understood that other similar embodiments may be used or modifications and additions may be made to the described embodiment for performing the same function of the present invention without deviating there from. Therefore, the present invention should not be limited to any single embodiment, but rather construed in breadth and scope in accordance with the recitation of the appended claims.

What is claimed is:

1. A system that maximizes information content in an image fusion process that blends co-registered low light level images in the visible region of the electromagnetic spectrum with thermal infrared images, said infrared and visible images constituting two different image types, the system comprising:
   a fusion module for detecting which of the two image types has a greater quantity of structural information and increasing a weight of the pixels in the image type detected to have the greater quantity of structural information; and
   a plurality of contrast detectors in the fusion module for detecting a contrast for the two image types, wherein the plurality of contrast detectors include modules for determining an average standard deviation of pixel values for pixels in an image.

2. The system of claim 1, wherein the average standard deviation is taken over the entire image.

3. The system of claim 1, wherein the average standard deviation is taken over a predetermined region within the image.

4. The system of claim 1, further comprising a camera having infrared and visible outputs therefrom, wherein said fusion module detects the structural information in said infrared and visible outputs.

5. The system of claim 4, further comprising preprocessing modules for each of said infrared and visible outputs.

6. The system of claim 4, further comprising a display, wherein an information content of said infrared and visible outputs is made available to said display in terms of a Red plane, a Green plane, and a Blue plane.

7. The system of claim 6, wherein images from said Green plane are displayed at said display for situational awareness of a scene viewed by said camera.

8. The system of claim 6, wherein images in said Red plane, said Green plane and said Blue plane are categorized as being either one of: scene images and target images.

9. The system of claim 8, wherein scene images are displayed when raw infrared values from said camera are below a predetermined threshold.

10. The system of claim 8, wherein target images are colorized when raw infrared values from said camera are above a predetermined threshold.

11. The system of claim 10, wherein the color of infrared images is colorized so as to change the color from a normal color associated with the infrared image to an image which has an increased red color, wherein the increased red color emphasizes target features of a target when said raw infrared levels are above said predetermined threshold.

12. The system of claim 11, wherein said target features are colored red to orange, thus to emphasize said target features.

13. The system of claim 6, and further including a first limiter coupled to said infrared image for limiting the value of infrared pixels to be no greater than the value of Green plane pixels divided by two.

14. The system of claim 6, wherein said visible image has visible image pixels and further includes a second limiter coupled to said visible image setting a value of said visible image pixels to the greater of the low light level image value divided by at least one of four and the low light level image value, minus a raw infrared value, whichever is greater, and limiting to the value of the Green plane pixels divided by two.

15. The system of claim 1, wherein situational awareness is increased by categorizing image information as at least one of scene information and target information and colorizing the target images to highlight target features when raw infrared values are above a predetermined threshold.

16. The system of claim 15, further comprising a color change module for categorizing said image information as at least one of scene information and target information based on infrared pixel value inputs.

17. The system of claim 16, wherein said color change module changes infrared pixels to a shade of orange to red.

18. A method of maximizing information content in an image fusion process by blending co-registered low light level visible images in a visible region of the electromagnetic spectrum with thermal infrared images, said infrared and visible images constituting two different image types, the method comprising:
   detecting, in a fusion module, which of the two image types of the visible images and the infrared images has a greater quantity of structural information;
   increasing a weight of pixels in the image type detected to have the greater quantity of structural information; and
   detecting a contrast of the two image types using contrast detectors located in the fusion module, wherein the contrast detectors include modules for determining an average standard deviation of pixel values for pixels in an image.

* * * * *